United States Patent [19]
Foster

[11] Patent Number: 5,373,777
[45] Date of Patent: Dec. 20, 1994

[54] LINEAR HYDRAULIC MOTOR WITH SNUBBER

[76] Inventor: Raymond K. Foster, P.O. Box 1, Madras, Oreg. 97741

[21] Appl. No.: 161,663

[22] Filed: Dec. 3, 1992

[51] Int. Cl.$^5$ ............................................. F01B 11/02
[52] U.S. Cl. ........................................ 92/85 B; 92/143; 92/117 R; 92/117 A; 92/110; 91/22; 91/405
[58] Field of Search ................ 92/85 B, 143, 117 R, 92/117 A, 110, 66; 91/22, 25, 31, 405

[56] References Cited

U.S. PATENT DOCUMENTS

| | | |
|---|---|---|
| 2,629,504 | 2/1953 | Peterson . |
| 2,973,856 | 3/1961 | Brooks . |
| 3,023,739 | 3/1962 | Dickson, Jr. et al. ............... 91/405 |
| 3,390,616 | 7/1968 | Hammer ............................. 92/85 B |
| 3,534,875 | 10/1970 | Hallstrom, Jr. . |
| 3,905,290 | 9/1975 | Caughey . |
| 4,143,760 | 3/1979 | Hallstrom . |
| 4,144,963 | 3/1979 | Hallstrom . |
| 4,184,587 | 1/1980 | Hallstrom . |
| 4,474,285 | 10/1984 | Foster . |
| 4,492,303 | 1/1985 | Foster . |
| 4,508,211 | 4/1985 | Foster . |
| 4,580,678 | 4/1986 | Foster . |
| 4,700,611 | 10/1987 | Kaneko ............................... 91/405 |
| 4,712,467 | 12/1987 | Foster . |
| 4,821,868 | 4/1989 | Foster . |
| 5,125,325 | 6/1992 | Czukkermann ..................... 92/143 |

FOREIGN PATENT DOCUMENTS

1296087 5/1969 Germany .

*Primary Examiner*—Thomas E. Denion
*Attorney, Agent, or Firm*—David P. Campbell

[57] ABSTRACT

A linear hydraulic motor including a first piston rod (12) and piston head (16), a second piston rod (18) and piston head (26), and a cylinder housing (30), having a divider wall (46), adapted to reciprocate longitudinally on the piston heads (16, 26). The cylinder housing (30) has end members (34, 36) through which piston rods (12, 18) extend. Four fluid chambers (52, 54, 56, 58) are formed within the linear hydraulic motor. Fluid chambers (52, 56) communicate with each other through conduits (62), and fluid chambers (54, 58) communicate with each other through conduit (64). Piston rods (12, 18) include conduits (68, 70) for fluid communication with chambers (54, 56). A snubber (74) is provided in the divider wall (46) of the cylinder housing (30). The snubber (74) reciprocates within the divider wall (46) and is adapted to abut the inner ends of the piston rods (12, 18) as the divider wall (46) approaches piston heads (16, 26) during the reciprocating process.

14 Claims, 4 Drawing Sheets

LINEAR HYDRAULIC MOTOR WITH SNUBBER

TECHNICAL FIELD

This invention relates to improvements in linear hydraulic motors, and in particular, to the provision of a snubber or dampening device for a linear hydraulic motor to alleviate end-of-stroke bottoming forces within such motors.

BACKGROUND ART

The linear hydraulic motor of the present invention is suited particularly for use in a reciprocating floor conveyor, but it is believed to have general utility.

Reciprocating floor conveyors generally include an array of floor members or conveyor slats, divided into groups that operatively reciprocate back and forth along the conveyor. A hydraulic drive system operates to drive at least a majority of the groups of conveyor slats in unison in a desired load conveying direction. The drive system then retracts the groups of conveyor slats individually. Systems are in use in which all of the groups of conveyor slats are driven in unison, in the desired load conveying direction, and then are individually retracted sequentially. It has also been proposed to drive a majority of the conveyor slats in the desired load conveying direction while at the same time retracting the remaining conveyor slats. The present invention has application with both of these types of systems, as well as with any type of drive system used for reciprocating conveyor slats in a manner to walk a load onto or off of the conveyor.

For background purposes, reference is made to U.S. Pat. No. 4,821,868 of Foster, granted Apr. 18, 1989. This patent discloses a drive frame assembly for a reciprocating floor conveyor, which assembly uses linear hydraulic motors. Reference is also made to U.S. Pat. No. 4,712,467 of Foster, granted Dec. 15, 1987. This patent discloses a combination linear hydraulic motor and transfer valve particularly suited for use in driving reciprocating floor conveyors. Reference should also be made to a text entitled "Hydraulic System Analysis" by George R. Keller, and published by the editors of *Hydraulics & Pneumatics Magazine*, copyright 1978, Section 9.6, pages 130–132, "Actuator Stroke Snubbing." Section 9.6 discusses load alleviation devices for actuators. The foregoing references should be considered in order to put the present invention into proper perspective.

Further reference is made to U.S. Pat. No. 4,143,760, granted Mar. 13, 1979; U.S. Pat. No. 4,144,963, granted Mar. 20, 1979; U.S. Pat. No. 4,184,587, granted Jan. 22, 1980; all to Olof A. Hallstrom. Reference is also made to my U.S. Pat. Nos. 4,474,285; 4,492,303; 4,508,211; and 4,580,678.

Earlier forms of reciprocating floor conveyors are disclosed by U.S. Pat. No. 2,629,504, granted in February of 1953 to Peterson; by U.S. Pat. No. 2,973,856, granted in Mar. of 1961 to Brooks; by U.S. Pat. No. 3,534,875, granted in October of 1970 to Hallstrom; by U.S. Pat. No. 3,905,290, granted Sep. 16, 1975, to Robert A. Caughey; and by West German Patent Publication No. 1,296,087, published in May of 1969. These patents are only generally related to a particular application of the subject invention and require no further comment.

DISCLOSURE OF THE INVENTION

Briefly described, the present invention comprises a linear hydraulic motor including a cylinder housing having a tubular sidewall and a radial divider wall. The radial divider wall separates the interior of the cylinder housing into a first fluid chamber on a first side of the divider wall and a second fluid chamber on the opposite side of the divider wall. The divider wall includes an axial opening. A piston head is provided within the tubular sidewall. The first fluid chamber is defined within the tubular sidewall between the divider wall and the piston head. A piston rod is connected to the piston head and extends from the piston head in a direction opposite the divider wall. The piston rod includes a rod passageway having an inner end opening confronting the divider wall. A snubber is snugly and slidably received in the axial opening of the divider wall. The central portion of the snubber is longer than the divider wall is thick. The snubber includes a first end portion within the first fluid chamber confronting the end opening of the rod passageway, and includes a second end portion within the second fluid chamber. Fluid pressure is introduced into the second fluid chamber while fluid is removed from the first fluid chamber through the rod passageway. The divider wall is moved relatively toward the piston head. Fluid pressure in the second fluid chamber acts on the second end of the snubber and moves the snubber endwise toward the piston head into the first chamber. After the first end portion of the snubber engages the piston head, the divider wall slides relative to the snubber and moves toward the piston head, so that the second end portion of the snubber moves further into the second fluid chamber against resistance of fluid pressure therein.

Preferably, the first and second end portions of the snubber are larger in diameter than the central portion of the snubber, so that the enlarged first and second end portions act as stops. In addition, the enlarged second end portion of the snubber has a larger outer surface confronting the fluid in the second fluid chamber. This provides an enhanced dampening effect.

According to an aspect of the invention, a second piston head is provided within the tubular wall of the cylinder housing. The second piston head defines between it and the divider wall the second fluid chamber in the cylinder housing. The cylinder housing and radial divider wall are adapted to move relative to the first and second piston heads. Preferably, the first and second piston heads are spaced from one another a fixed distance.

According to another aspect of the invention, the first end portion of the snubber is aligned with the inner end opening of the rod passageway so that upon engagement of the first end portion of the snubber with the piston head, the inner end opening of the rod passageway is closed. The first end portion of the snubber includes an orifice allowing fluid communication between the first fluid chamber and the rod passageway upon engagement of the first end portion of the snubber with the piston head. The orifice in the first end portion of the snubber provides a dampening effect as fluid flow from the first fluid chamber is restricted through the orifice into the rod passageway of the piston rod.

Preferably, the piston head includes a recessed portion adjacent the inner end opening of the rod passageway. The first end portion of the snubber is adapted to move into the recess prior to the first end portion engaging the piston head. This creates a dashpot effect for providing an initial cushioning effect between the divider wall and the piston head.

According to another aspect of the invention, a second piston rod is mounted to the second piston head. The second piston rod includes a rod passageway for providing fluid communication with the second fluid chamber. Fluid pressure is introduced into the first fluid chamber and exhausted from the second fluid chamber via its rod passageway, and the divider wall moves relatively toward the second piston head. Fluid pressure in the first fluid chamber acts on the first end portion of the snubber and moves the second end portion of the snubber endwise further into the second fluid chamber toward the second piston head. The second end portion of the snubber engages the piston head while the divider wall slides relative to the snubber and moves toward the second piston head, so that the first end portion of the snubber moves into the first fluid chamber against resistance of fluid pressure therein.

Preferably, the second end portion of the snubber is aligned with the inner end opening of the rod passageway of the second piston rod. The second end portion of the snubber is enlarged and includes an orifice for providing fluid communication between the second fluid chamber and the rod passageway of the second piston rod upon the second end portion of the snubber engaging the second piston head and blocking the inner end opening of the rod passageway of the second piston rod.

Preferably, the second piston head includes a recess similar to that of the first piston head. The second end portion of the snubber is adapted to move within the recess in the second piston head prior to engaging the second piston head. This provides an initial dampening effect between the divider wall and the second piston head.

According to another aspect of the invention, the cylinder housing includes a pair of end members, each end member including an axial opening through which extends a piston rod. The end members define a pair of outer fluid chambers between the end members and the piston heads. Each outer fluid chamber is in fluid communication with the first or second fluid chamber that is on the opposite side of the divider wall. Thus, as the cylinder housing reciprocates on the piston heads, fluid pressure is introduced and exhausted uniformly into the first and second fluid chambers and their corresponding outer fluid chambers.

Other advantages, features, and objects of the present invention will become apparent from the following description of the best mode of the invention and the accompanying drawings and the claims, all of which are incorporated herein as part of the disclosure of the invention.

BRIEF DESCRIPTION OF THE DRAWINGS

Like reference numerals are used to designate like parts throughout the several views of the invention, and.

BEST MODE FOR CARRYING OUT THE INVENTION

Figure 1:
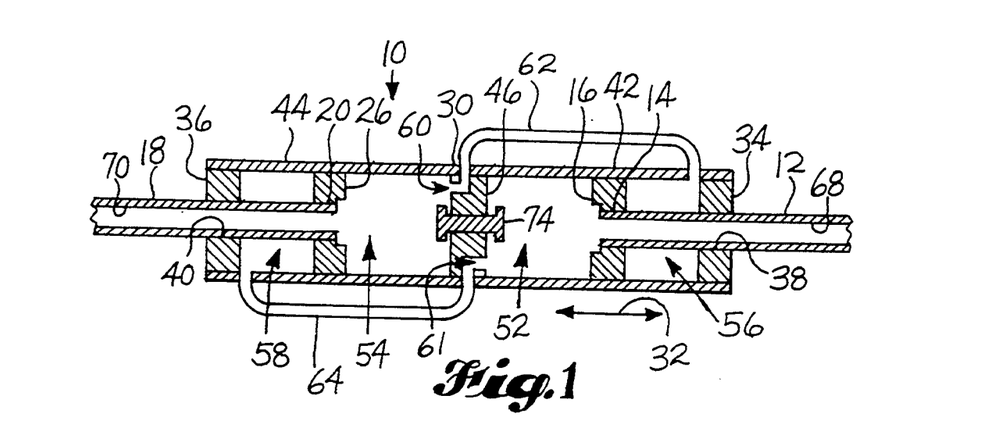
FIG. 1 is a schematic view of the linear hydraulic motor and snubber of the present invention.

FIG. 1 is a schematic view illustrating the basic components of a linear hydraulic motor 10. The motor comprises a first fixed piston rod 12 having an inner end 14. A first piston head 16 is connected to inner end 14 of piston rod 12. The other end of piston rod 12 (not shown) is fixedly secured to a frame structure. For a reciprocating floor conveyor, the other end of piston rod 12 is mounted to the drive assembly frame structure mounted beneath the conveyor floor.

Linear hydraulic motor 10 also includes a fixed second piston rod 18 having an inner end 20. A second piston head 26 is connected to inner end 20 of piston rod 18. In a given installation, piston heads 16, 26 are fixed in position and spaced from one another a predetermined distance. The outer end of piston rod 18 (not shown) is fixedly mounted to a drive assembly frame structure in a manner similar to piston rod 12.

Cylinder housing 30 includes first and second end members 34, 36. Each end member 34, 36 is suitably connected to its end of cylinder housing 30. End member 34 includes a central opening 38 through which piston rod 12 extends. It also includes oil and dirt seals (not shown) for sealing between it and the piston rod 12. In like fashion, end member 36 includes a central opening 40 through which piston rod 18 extends. It also includes oil and dirt seals for sealing between it and the piston rod 18. Cylinder housing 30 is slidably mounted on piston heads 16, 26 and piston rods 12, 18. Cylinder housing 30 reciprocates longitudinally on piston heads 16, 26 in the direction indicated by arrow 32.

In preferred form, cylinder housing 30 is composed of two equal length tubular sections 42, 44 and a center radial divider wall 46. Divider wall 46 may be a disk to which the inner ends of sections 42, 44 are welded.

A first fluid chamber 52 is formed within cylinder housing 30 between first piston head 16 and divider wall 46. A second fluid chamber 54 is formed within cylinder housing 30 between divider wall 46 and second piston head 26. Third and fourth outer fluid chambers 56, 58 are formed within cylinder housing 30 between piston heads 16, 26 and the end members 34, 36.

Divider wall 46 includes a first passageway 60 having an inner end communicating with second fluid chamber 54 and an outer end communicating with a first conduit 62. First conduit 62 is interconnected between first passageway 60 and outer fluid chamber 56. Divider wall 46 also includes a second passageway 61 having an inner end communicating with first fluid chamber 52 and an outer end communicating with a second conduit 64. Second conduit 64 is interconnected between second passageway 61 and outer fluid chamber 58. Preferably, first and second conduits 62, 64 are lengths of rigid tubing having right angle bends at their ends. The ends of the tubing may be welded to wall portions of cylinder housing sections 42, 44 and to the periphery of divider wall 46.

First piston rod 12 includes a rod passageway or conduit 68 having an inner end confronting divider wall 46 and in communication with first fluid chamber 52. Second piston rod 18 includes a rod passageway or conduit 70 having an inner end confronting divider wall 46 and in communication with second fluid chamber 54. Conduits 68, 70 provide means for introducing and exhausting fluid into and out of the various fluid chambers 52, 54, 56, 58 for controlling the reciprocating movement of the cylinder housing 30.

Figure 2:
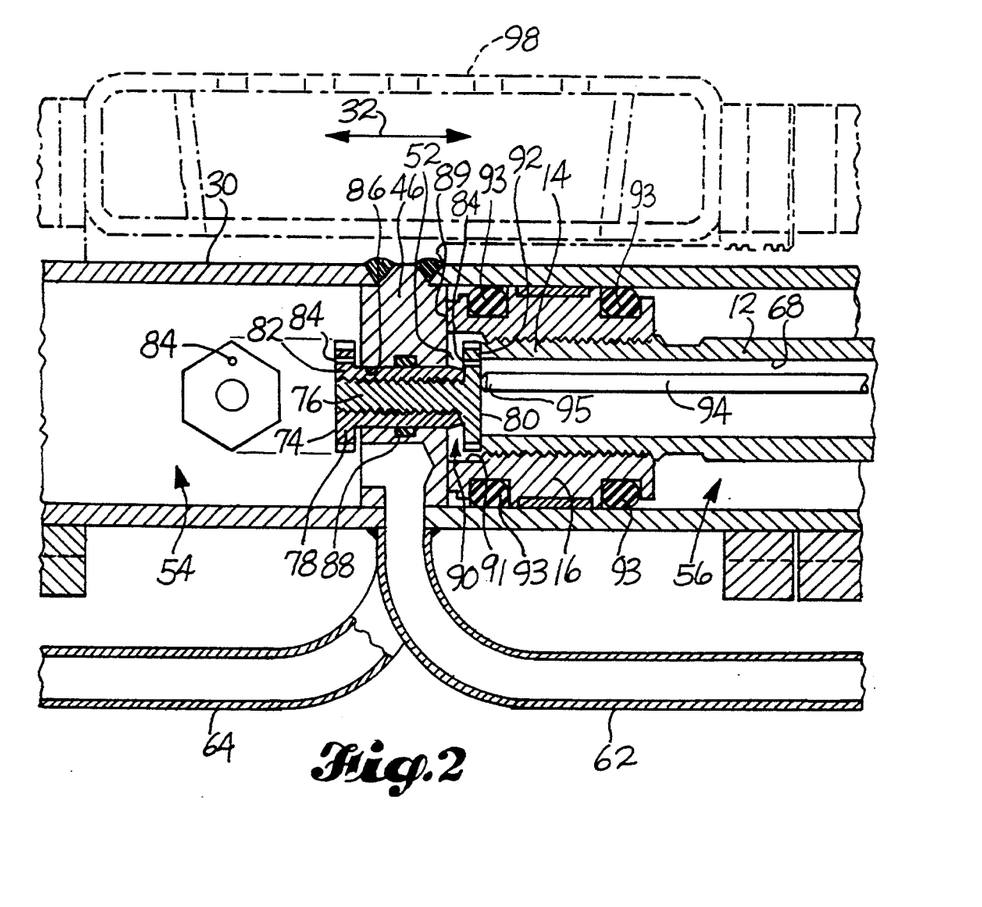
FIG. 2 is a fragmentary detailed section view of the snubber and one of the pistons of the linear hydraulic motor of FIG. 1.

A dampening device in the form of a snubber 74 is slidably mounted within divider wall 46. FIG. 2 best illustrates the design of snubber 74. Snubber 74 is formed of two parts, a T-shaped male part 76 with an externally threaded central portion and a T-shaped female part 78 with an internally threaded central portion. Parts 76, 78 are threadably coupled to each other to form a spool-like snubber having enlarged first and second end portions 80, 82. End portions 80, 82 are hexagonal in shape and each include an orifice 84. End portion 80 functions as a seal plate for closing off the inner end opening of the conduit 68 of piston rod 12, as shown in FIG. 2. End portion 82, in like manner, acts as a seal plate by closing off the conduit of the second piston rod. Divider wall 46 includes a central opening 86 that slidably receives the central portion of snubber 74. The central portion of snubber 74 is longer than the thickness of divider wall 46. Seal plates 80, 82 function as stops to limit the travel of snubber 74. Seals 88 are provided between snubber 74 and divider wall 46.

Piston head 16 is threadably mounted onto inner end 14 of piston rod 12. Piston head 16 includes an annular projection 89 that forms a recess 90 defined by an annular wall 91 of piston head 16 and the inner end wall 92 of piston rod 12. Seals 93 secure first fluid chamber 52 from outer fluid chamber 56. The second piston head is identical to piston head 16 and is mounted onto its piston rod in a manner similar to that just described for piston head 16.

Seal plate 80 of snubber 74 is adapted to seat against inner end wall 92 of piston rod 12, as shown in FIG. 2, closing off the inner end opening of conduit 68. Orifice 84 is positioned about seal plate 80 such that it is not blocked when seal plate 80 seats against inner end wall 92 of piston rod 12.

Piston rod 12 is shown to include an operator rod 94 that extends through conduit 68 of piston rod 12. Operator rod 94 includes an inner end 95 adapted to engage seal plate 80 of snubber 74. The outer end (not shown) of operator rod 94 is coupled to a transfer valve in a manner disclosed in my prior U.S. Pat. No. 4,712,467, with reference to FIG. 4. Operator rod 94 reciprocates longitudinally within conduit 68 when engaged by snubber 74.

A cross beam 98 is shown in dashed lines in FIG. 2. Cross beam 98 is connected to the cylinder housing 30 by suitable means, not shown. As cylinder housing 30 reciprocates back and forth in the direction of arrow 32, cross beam 98, likewise, reciprocates back and forth to drive a group of conveyor slats. A reciprocating floor conveyor includes a linear hydraulic motor for each group of conveyor slats. The linear hydraulic motors are operated by a control system in the manner discussed in my U.S. Pat. No. 4,712,467.

Figure 3:
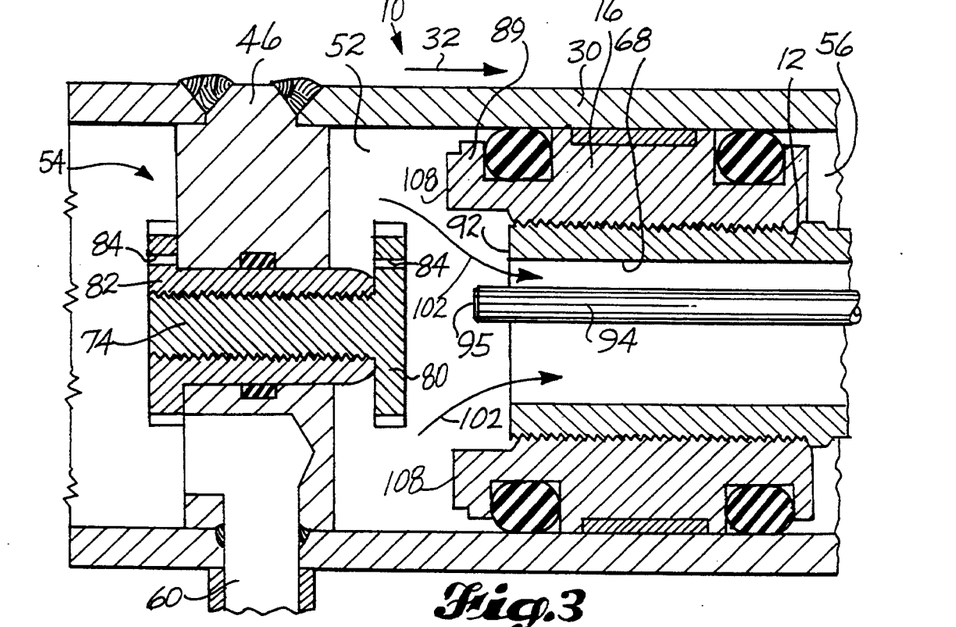
FIG. 3 is a fragmentary detailed view of the snubber and piston of FIG. 2, illustrating fluid flow prior to flow restriction caused by the snubber.

FIGS. 3-8 illustrate operation of the linear hydraulic motor 10. As stated previously, the piston heads and piston rods remain stationary, while the cylinder housing 30 reciprocates in the direction of arrow 32. In this mode of operation, as shown in FIG. 3, fluid is introduced into fluid chamber 54 and exhausted from fluid chamber 52 through conduit 68 in piston rod 12. Fluid is introduced into fluid chamber 54 through the conduit of the second piston rod. Passageway 60 in divider wall 46 allows high pressure fluid from fluid chamber 54 to be introduced into outer fluid chamber 56 on the far side of piston head 16. Passageway 61 in divider wall 46 is not shown, but provides fluid communication between chambers 52 and 58.

In this mode of operation, snubber 74 is forced to the right, as shown in FIG. 3, by high pressure fluid acting on seal plate 82 of snubber 74. Cylinder housing 30 is reciprocated to the right, as indicated by arrow 32. Without a snubbing device installed, divider wall 46 of cylinder housing 30 would bottom out against annular projection 89 of piston head 16. Such an impact increases wear within the linear hydraulic motor, and in addition produces an undesirable noise. For a linear hydraulic motor that reciprocates several times per minute, such a noise can be objectionable. Snubber 74 alleviates such an objectionable noise.

As shown in FIG. 3, cylinder housing 30 is near the end of its stroke, and divider wall 46 of cylinder housing 30 has moved into proximity with piston head 16 of piston rod 12. Seal plate 80 of snubber 74 is extended from divider wall 46 toward piston head 16 by fluid pressure in chamber 54. Outer end 95 of operator rod 94 extends beyond end wall 92 of piston rod 12. As divider wall 46 moves toward piston head 16, fluid within chambers 52, 58 is exhausted through conduit 68 of piston rod 12, as indicated by arrows 102.

Figure 4:
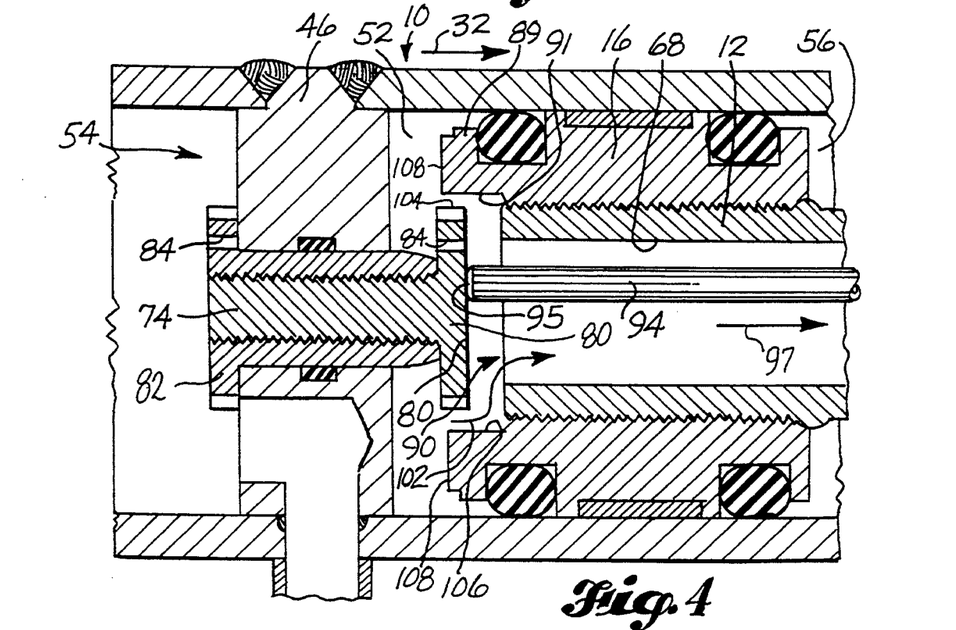
FIG. 4 is a fragmentary detailed view similar to FIG. 3, illustrating the initial phase of flow restriction caused by the snubber.

As shown in FIG. 4, as seal plate 80 of snubber 74 moves into recess 90 formed by annular projection 89 of piston head 16, the flow area of the fluid from chamber 52 out through conduit 68 of piston rod 12 is restricted to the area between the outer edges 104 of seal plate 80 and annular wall 91 of piston head 16. The restricted fluid flow, as indicated by arrows 102, resists movement of seal plate 80 further into recess 90. Such resistance creates an initial cushioning or dampening effect to alleviate the bottoming force of divider wall 46 against the inner surface 108 of annular projection 89 of piston head 16. Also shown in FIG. 4 is seal plate 80 engaging outer end 95 of operator rod 94, which actuates a transfer valve, as discussed in my '467 patent. Operator rod 94 moves in the direction of arrow 97.

Figure 5:
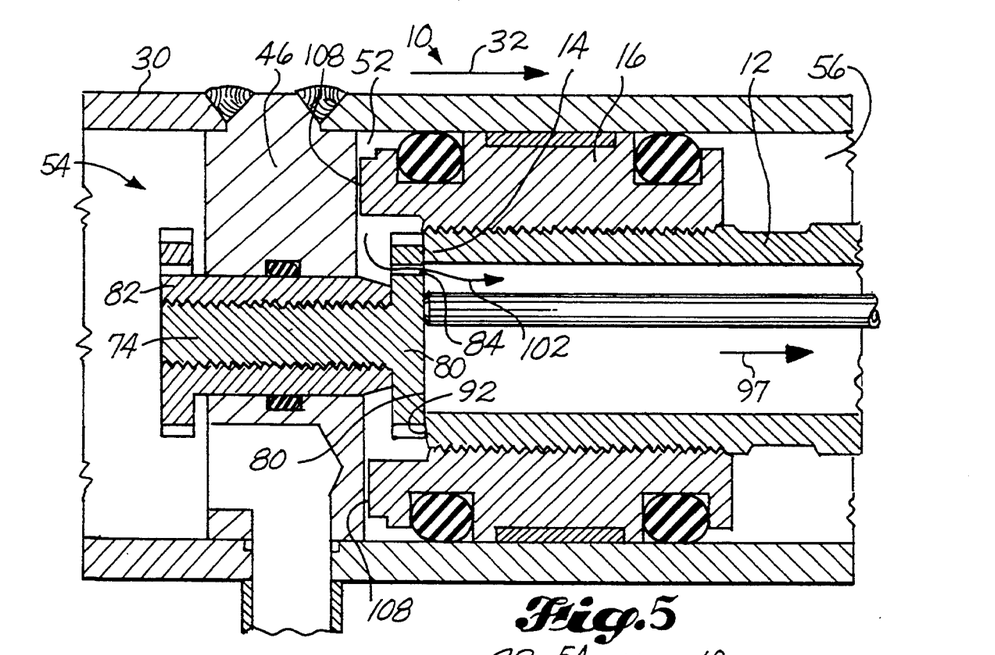
FIG. 5 is a fragmentary detailed view similar to FIG. 3, illustrating the snubber and radial divider wall of the cylinder housing moving endwise relatively to each other.

As shown in FIG. 5, eventually seal plate 80 of snubber 74 contacts inner end wall 92 of piston rod 12. Divider wall 46 has not contacted the inner surface 108 of piston head 16, but is in close proximity thereto. Fluid flow from chambers 52, 58 is restricted to orifice 84 of seal plate 80, as indicated by arrow 102. The limited flow area provided by orifice 84 creates an enhanced dampening effect, as divider wall 46 moves into engagement with piston head 16.

After the seal plate 80 engages end wall 92 of piston rod 12, divider wall 46 begins to slide along the central portion of snubber 74, while snubber 74 remains stationary in abutment with piston rod 12. This relative movement between snubber 74 and divider wall 46 causes seal plate 82 within fluid chamber 54 to extend further into fluid chamber 54, against the force of the fluid pressure within the chamber 54. For divider wall 46 to move relative to snubber 74, it is necessary that the fluid pressure within chamber 54, acting against divider wall 46, overcome the force necessary to extend seal plate 82 into fluid chamber 54, as shown in FIG. 5. This creates an additional dampening or cushioning effect. This additional dampening effect is an important feature of the invention. The high pressure fluid used to actuate the linear hydraulic motor and move the cylinder housing and divider wall toward a piston head is used to provide an end-of-stroke dampening effect to cushion the impact between the divider wall and piston head.

Thus, as divider wall 46 slides along the central portion of snubber 74, two dampening forces are acting in conjunction to soften the impact of divider wall 46 against piston head 16. The first dampening force is the flow restriction through orifice 84, and the second dampening force is the force on seal plate 82 by the high pressure fluid within chamber 54 as seal plate 82 projects further into fluid chamber 54.

Figure 6:
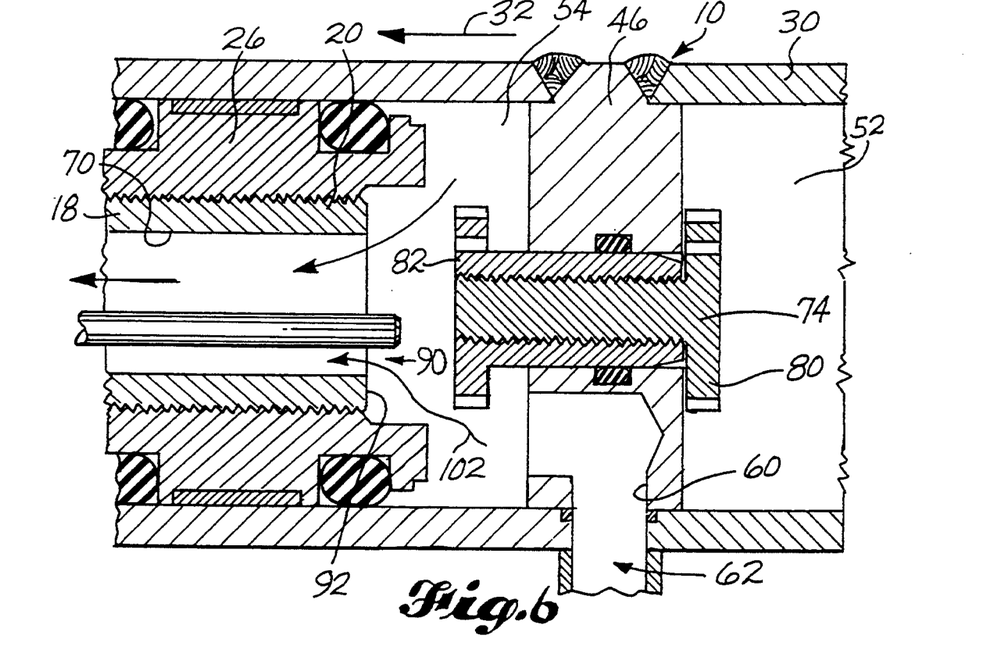
FIG. 6 is a fragmentary detailed view of the snubber and the second piston, illustrating the dual action of the snubber.
Figure 7:
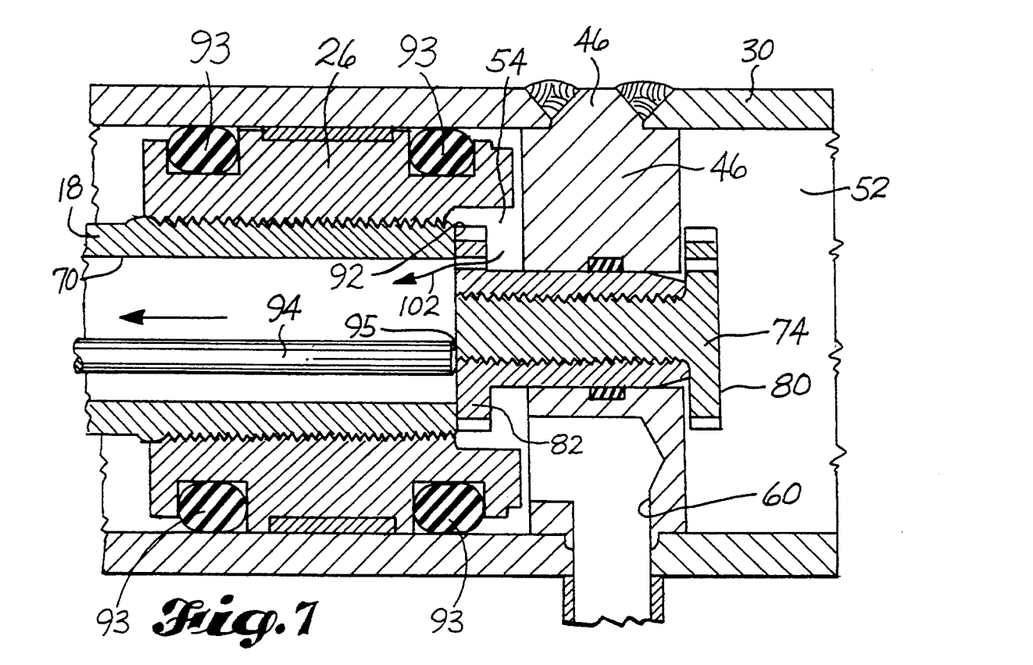
FIG. 7 is a fragmentary detailed view, similar to FIG. 6, illustrating a secondary phase of flow restriction caused by the snubber.

FIGS. 6 and 7 illustrate the dual cushioning function of snubber 74. In FIG. 6, cylinder housing 30 is moving to the left, as indicated by arrow 32, toward second piston head 26. Cylinder housing 30 is approaching the end of its stroke, and divider wall 46 of housing 30 is approaching piston head 26, which is threadably mounted at inner end 20 of second piston rod 18. In this mode of operation, fluid is introduced into fluid chamber 52, and is exhausted out of fluid chamber 54 through conduit 70 in piston rod 18. Snubber 74 has shifted to the left so that its first seal plate 80 abuts against divider wall 46 and its second seal plate 82 projects into fluid chamber 54. Fluid from outer fluid chamber 58 is exhausted through conduit 62, through passageway 60 and through fluid chamber 54 into conduit 70 of piston rod 18.

Seal plate 82 of snubber 74 moves into recess 90 formed in piston head 26, providing an initial dampening phase. Then seal plate 82 engages inner end 95 of operator rod 94 and moves into engagement with inner end 92 of piston rod 18, as shown in FIG. 7. Divider wall 46 continues to move endwise along the central portion of snubber 74 as snubber 74 remains stationary in abutment with piston rod 18. This creates a secondary phase of dampening. As should be apparent from the figures, the cushioning or dampening action of the snubber 74, and its interaction with piston head 26 and the fluid within fluid chamber 52, are similar to the dampening effects achieved with snubber 74 and piston head 16 at the other end of cylinder housing 30.

Figure 8:
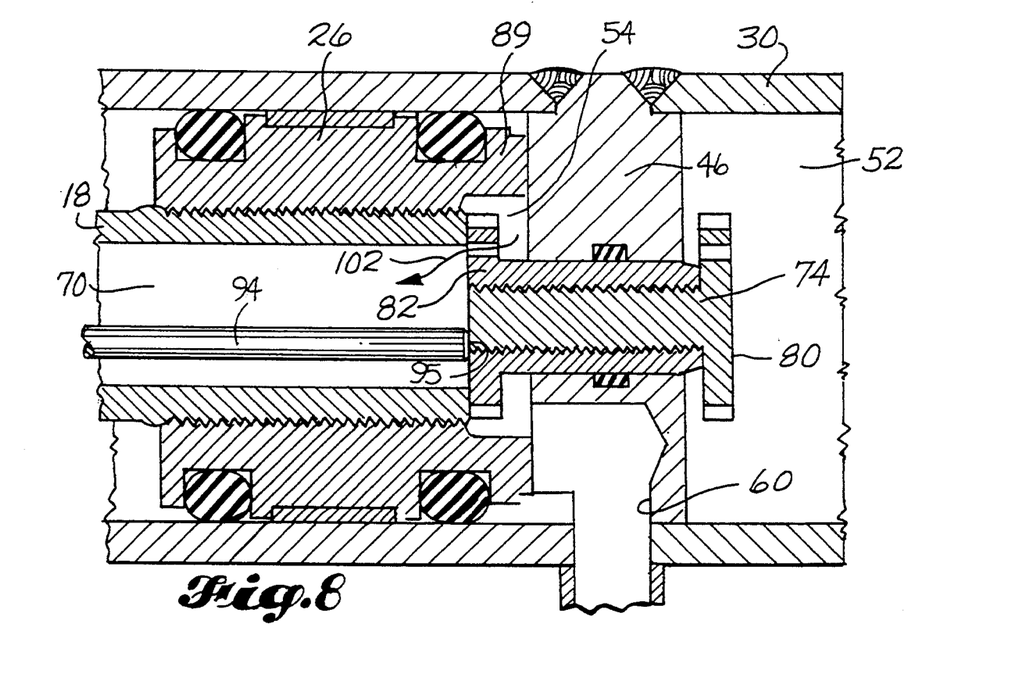
FIG. 8 is a view similar to FIG. 7, illustrating the snubber and the radial divider wall moving endwise relative to each other.

As shown in FIG. 8, first seal plate 80 moves further into fluid chamber 52 as divider wall 46 moves along the central portion of snubber 74 into engagement with annular projection 89 of piston head 26. As seal plate 80 extends into fluid chamber 52, high pressure fluid therein acts against the seal plate 80 and provides a dampening effect. Thus, snubber 74 functions in a dual capacity to provide a cushion at both end-of-stroke positions of cylinder housing 30.

The illustrated and described embodiments are presented by way of example. The scope of protection is not to be limited by these examples. Rather, protection is to be determined by the claims which follow, construed in accordance with the established rules of patent claim construction, including use of the doctrine of equivalents.

What is claimed is:

1. A linear hydraulic motor, comprising:
   a cylinder housing including a tubular sidewall and a radial divider wall dividing the interior of the cylinder housing into a first fluid chamber on a first side of the divider wall and a second fluid chamber on the opposite side of the divider wall, the divider wall including an axial opening,
   a piston head within the tubular sidewall confronting the divider wall and defining between the piston head and the divider wall the first fluid chamber,
   a piston rod connected to the piston head and extending from the piston head in a direction opposite the divider wall, the piston rod including a rod passageway having an inner end opening confronting the divider wall, and
   a snubber including a central portion snugly and slidably received in the divider wall opening, the central portion being longer than the divider wall is thick, the snubber including a first end portion within the first fluid chamber confronting the end opening of the rod passageway and a second end portion within the second fluid chamber,
   wherein fluid under pressure is introduced into the second fluid chamber while fluid is removed from the first fluid chamber through the rod passageway, and the divider wall is moved relatively towards the piston head, and fluid pressure in the second fluid chamber acts on the second end of the snubber and moves the snubber endwise towards the piston head into the first chamber,
   and wherein, after the first end portion of the snubber engages the piston head, the divider wall slides relative to the snubber and moves toward the piston head, so that the second end portion of the snubber moves further into the second fluid chamber against resistance of fluid pressure therein.

2. The linear hydraulic motor of claim 1, wherein the first and second end portions of the snubber are larger in diameter than the central portion of the snubber, so that the enlarged first and second end portions act as stops, and so that the second end portion has a larger outer surface confronting the fluid in the second fluid chamber.

3. The linear hydraulic motor of claim 1, and further comprising a second piston head defining between it and the divider wall the second fluid chamber in the cylinder housing, and wherein the cylinder housing and radial divider wall are adapted to move relative to the first and second piston heads.

4. The linear hydraulic motor of claim 3, wherein the first and second piston heads are spaced from one another a fixed distance.

5. The linear hydraulic motor of claim 1, wherein the first end portion of the snubber is aligned with the inner end opening of the rod passageway so that upon engagement of the first end portion of the snubber with the piston head, the inner end opening of the rod passageway is closed, and wherein the first end portion of the snubber includes an orifice allowing fluid communication between the first fluid chamber and the rod passageway upon engagement of the first end portion of the snubber with the piston head.

6. The linear hydraulic motor of claim 5, wherein the first end portion of the snubber is larger in diameter than the central portion of the snubber, and the orifice extends through the enlarged first end portion of the snubber.

7. The linear hydraulic motor of claim 6, wherein the piston head includes a recessed portion adjacent the inner end opening of the rod passageway, and wherein the first end portion of the snubber is adapted to move into the recess prior to the first end portion engaging the piston head.

8. A linear hydraulic motor, comprising:

a first piston rod having a first piston head mounted at its inner end, a second piston rod having a second piston head mounted at its inner end, the first and second piston heads being spaced from each other a predetermined distance, a cylinder housing mounted to reciprocate on the first and second piston heads, the cylinder housing including a radial divider wall between the piston heads, wherein a first fluid chamber is formed within the cylinder housing between the first piston head and the divider wall, and a second fluid chamber formed within the cylinder housing between the divider wall and the second piston head, the first piston rod including a conduit having an inner end opening in communication with the first fluid chamber, a snubber slidably mounted within an axial opening in the divider wall for dampening the bottoming forces between the divider wall and the first piston head, the snubber having a central portion and a first and second end portion, the central portion being longer than the divider wall is thick, whereby, fluid pressure is introduced into the second fluid chamber and exhausted from the first fluid chamber via the conduit, and the divider wall moves relatively towards the first piston head, and wherein fluid pressure in the second fluid chamber acts on the second end portion of the snubber and moves the first end portion of the snubber endwise further into the first fluid chamber towards the first piston head, and wherein the first end portion of the snubber engages the first piston head while the divider wall slides relative to the snubber and moves towards the first piston head, so that the second end portion of the snubber moves into the second fluid chamber against resistance of fluid pressure therein.

9. The linear hydraulic motor of claim 8, wherein the first piston head includes a recess slightly larger than the dimensions of the first end portion of the snubber, the first end portion of the snubber adapted to move within the recess prior to engaging the first piston head, so as to provide a dampening effect of the divider wall against the first piston head.

10. The linear hydraulic motor of claim 8, wherein the first end portion of the snubber is larger in diameter than the central portion of the snubber and includes an orifice extending through the enlarged first end portion of the snubber, the first end portion of the snubber being aligned with the conduit of the first piston rod, so that as the enlarged first end portion of the snubber engages the first piston head, the inner end opening of the conduit is blocked and the orifice provides fluid communication between the first fluid chamber and the conduit.

11. The linear hydraulic motor of claim 8, wherein the second piston rod includes a conduit in communication with the second fluid chamber wherein fluid pressure is introduced into the first fluid chamber and exhausted from the second fluid chamber via the conduit in the second piston rod, and the divider wall moves relatively towards the second piston head, and wherein fluid pressure in the first fluid chamber acts on the first end portion of the snubber and moves the second end portion of the snubber endwise further into the second fluid chamber towards the second piston head, and wherein the second end portion of the snubber engages the piston head while the divider wall slides relative to the snubber and moves towards the second piston head, so that the first end portion of the snubber moves into the first fluid chamber against resistance of fluid pressure therein.

12. The linear hydraulic motor of claim 11, wherein the snubber includes an enlarged second end portion in alignment with the end opening of the conduit of the second piston rod, the enlarged second end portion of the snubber including an orifice for providing fluid communication between the second fluid chamber and the conduit of the second piston rod upon the second end portion of the snubber engaging the second piston head and blocking the inner end opening of the conduit of the second piston rod.

13. The linear hydraulic motor of claim 12, wherein the second piston head includes a recess adjacent the inner end opening of the conduit in the second piston rod, and wherein the second end portion of the snubber is adapted to move within the recess in the second piston head prior to engaging the second piston head.

14. The linear hydraulic motor of claim 8, wherein the cylinder housing includes a pair of end members, each end member including an axial opening through which extends a piston rod, the end members defining a pair of outer fluid chambers between the end members and the piston heads, each outer fluid chamber being in fluid communication with a selected one of the first and second fluid chambers that is on the opposite side of the divider wall.

* * * * *

UNITED STATES PATENT AND TRADEMARK OFFICE
CERTIFICATE OF CORRECTION

PATENT NO: 5,373,777

DATED: December 20, 1994

INVENTOR(S): Raymond Keith Foster

It is certified that error appears in the above-identified patent and that said Letters Patent are hereby corrected as shown below:

On the title page, item [22], the date of filing should be
-- December 3, 1993 -- and not "December 3, 1992".

Signed and Sealed this

Second Day of July, 1996

*Attest:*

BRUCE LEHMAN

*Attesting Officer*   *Commissioner of Patents and Trademarks*